(12) United States Patent
King

(10) Patent No.: US 11,155,126 B2
(45) Date of Patent: Oct. 26, 2021

(54) CENTRAL TYRE INFLATION SYSTEM AND METHOD

(71) Applicant: JAGUAR LAND ROVER LIMITED, Coventry (GB)

(72) Inventor: Paul King, Leicestershire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 698 days.

(21) Appl. No.: 15/579,127

(22) PCT Filed: May 27, 2016

(86) PCT No.: PCT/EP2016/062011
§ 371 (c)(1),
(2) Date: Dec. 1, 2017

(87) PCT Pub. No.: WO2016/193148
PCT Pub. Date: Dec. 8, 2016

(65) Prior Publication Data
US 2018/0162181 A1 Jun. 14, 2018

(30) Foreign Application Priority Data

Jun. 1, 2015 (GB) ..................................... 1509437
Jun. 1, 2015 (GB) ..................................... 1509438

(51) Int. Cl.
*B60C 23/00* (2006.01)
*F16K 15/20* (2006.01)
*F16K 37/00* (2006.01)

(52) U.S. Cl.
CPC ............ *B60C 23/003* (2013.01); *F16K 15/20* (2013.01); *F16K 37/0091* (2013.01)

(58) Field of Classification Search
None
See application file for complete search history.

(56) References Cited

U.S. PATENT DOCUMENTS 6,098,682 A * 8/2000 Kis ...................... B60C 23/003
137/224
6,532,980 B1 3/2003 Langeveld
(Continued)

FOREIGN PATENT DOCUMENTS

CN 103526675 A 1/2014
EP 0208469 A2 1/1987
WO WO2015176870 A1 11/2015

OTHER PUBLICATIONS

Combined Search and Examination Report for application No. GB1509437.8, dated Nov. 27, 2015, 5 pages.
(Continued)

*Primary Examiner* — Peter D Nolan
*Assistant Examiner* — Ce Li Li
(74) *Attorney, Agent, or Firm* — Reising Ethington P.C.

(57) ABSTRACT

A controller for controlling a pneumatic control valve (PCV) in a central tire inflation system (CTIS). The controller includes an electronic processor having an electrical input for receiving a supply-side pressure signal. The electronic processor is configured to control a first control valve ($V_{INSS}$) to generate a pneumatic control signal for changing an operating state of a pneumatic control valve (PCV). The electronic processor also monitors the supply-side pressure signal and identifies a change in the operating state of the pneumatic control valve (PCV) in dependence on a change in the supply-side pressure. The electronic processor is configured to output a first valve close signal upon determining that the pneumatic control valve (PCV) has changed operating state. Also provided is a CTIS incorporating a controller; to a vehicle; and to a method of controlling a pneumatic control valve (PCV).

20 Claims, 9 Drawing Sheets

(56) References Cited

U.S. PATENT DOCUMENTS

| | | | |
|---|---|---|---|
| 2003/0192372 A1 | 10/2003 | Claussen et al. | |
| 2007/0214963 A1* | 9/2007 | Hoffman | B60T 17/002 96/108 |
| 2012/0138826 A1 | 6/2012 | Morris et al. | |
| 2014/0034202 A1* | 2/2014 | Voith | B60C 29/06 152/415 |

OTHER PUBLICATIONS

International Search Report for International application No. PCT/EP2016/062011, dated Aug. 22, 2016, 5 pages.

Written Opinion for International application No. PCT/EP2016/062011, dated Aug. 22, 2016, 6 pages.

\* cited by examiner

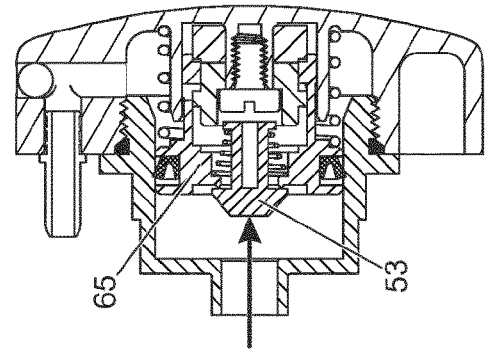
FIG. 2D Reset mode
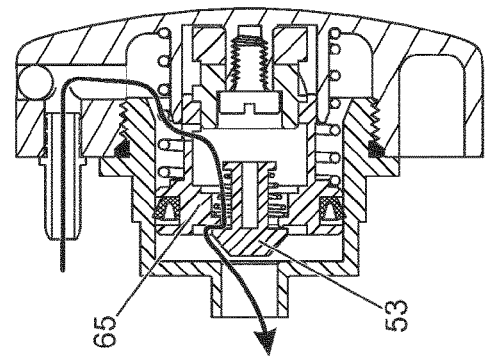
FIG. 2C Deflate / Pressure Check mode
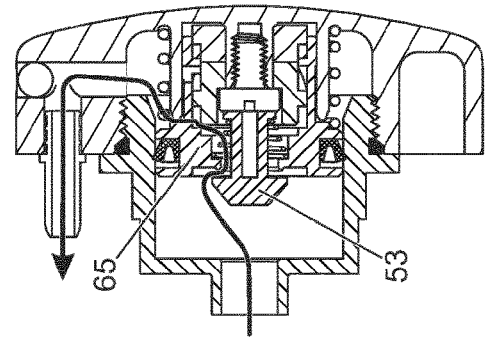
FIG. 2B Inflate mode
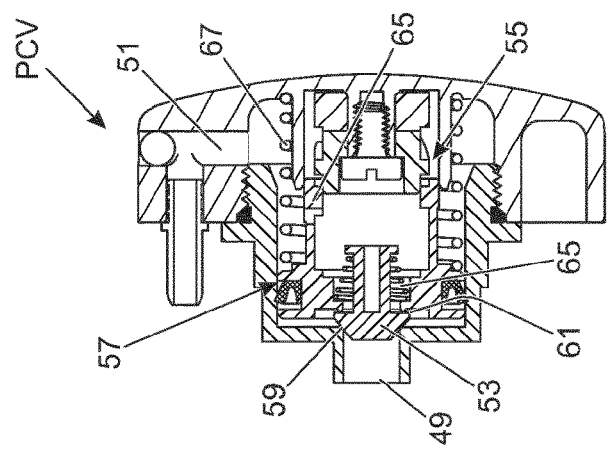
FIG. 2A Normal run mode

CENTRAL TYRE INFLATION SYSTEM AND METHOD

TECHNICAL FIELD

The present disclosure relates to a central tire inflation system (CTIS) and to a related method. More particularly, but not exclusively, the present disclosure relates to a controller for controlling operation of a pneumatic control valve in a CTIS.

BACKGROUND

A CTIS typically comprises a compressed air source located on-board the vehicle and connected to one or more tires. Tire pressure can therefore be adjusted by operating the CTIS. The CTIS delivers compressed air to tire supply lines. In some examples, the supply lines are integrated into the vehicle axles. Various valves are provided in the CTIS to control flow of compressed air. In one example of a CTIS system to avoid the need to include an additional electrical control to each wheel, the valve at each wheel controlling flow of air into and out of the tire may be a pneumatically controlled valve, i.e. the state of the valve is changed by a pneumatic signal as opposed to an electrical signal.

The present invention relates to a revised control strategy for controlling operation of the pneumatic controlled valve.

SUMMARY OF THE INVENTION

Aspects of the present invention relate to a controller for controlling a pneumatic control valve; to a central tire inflation system comprising a controller; to a vehicle; and to a related method.

According to a further aspect of the present invention there is provided a controller for controlling a pneumatic control valve, the controller comprising:
- an electronic processor having an electrical input for receiving a supply-side pressure signal; and
- an electronic memory device electrically coupled to the electronic processor and having instructions stored therein;
- the electronic processor being configured to control a first control valve to generate a pneumatic control signal for changing an operating state of a pneumatic control valve, the electronic processor being configured to output a first valve open signal to open the first control valve to initiate the pneumatic control signal, and to output a first valve close signal to close the first control valve to terminate said pneumatic control signal;
- wherein the electronic processor is configured to monitor the supply-side pressure signal and to identify a change in the operating state of the pneumatic control valve in dependence on a change in the supply-side pressure;
- the electronic processor being configured to output said first valve close signal upon determining that the pneumatic control valve has changed operating state. At least in certain embodiments, the present invention may reduce the duration of the pneumatic control signal required to actuate the pneumatic control valve.

The first valve close signal can be output if the change in the operating state of the pneumatic control valve is not detected within a predefined time period. The predefined time period can, for example, be defined with reference to output of the first valve open signal.

By controlling the first control valve to initiate and terminate the pneumatic control signal as described herein, the electronic processor can reduce the duration of the pneumatic control signal. The supply of compressed air required to generate the pneumatic control signal can be reduced. In certain implementations, the pneumatic control signal can be generated by supplying compressed air from a reservoir. By reducing the duration of the pneumatic control signal, the reduction in pressure in the reservoir can be reduced. Thus, the need to operate a compressor to replenish the reservoir can be reduced.

The first control valve can comprise an inlet valve for controlling the supply of compressed air from said first compressed air source. For example, the inlet valve can control the supply of compressed air to a gallery in communication with a supply line connected to the pneumatic control valve.

The change in the supply-side pressure can comprise one or more of the following: a change which is greater than or equal to a defined threshold; a change which is greater than or equal to a defined proportional change; and a change in a rate of change of the supply-side pressure.

The electronic processor can be configured to detect the change in the supply-side pressure within a prescribed time period.

The pneumatic control valve can change from a closed state to an open state. The pneumatic control valve can be latched in said closed state and/or said open state. The pneumatic control signal can unlatch the pneumatic control valve. The electronic processor can be configured to identify when the pneumatic control valve changes operating state in dependence on detection of a decrease in the supply-side pressure. The decrease in the supply-side pressure can be measured with respect to a pressure peak. A decrease in the supply-side pressure can indicate that the pneumatic control valve has changed from a closed state to an open state. Alternatively, the electronic processor can be configured to identify when the pneumatic control valve changes operating state in dependence on detection of an increase in the supply-side pressure. The increase in the supply-side pressure can be measured with respect to a pressure trough. An increase in the supply-side pressure can indicate that the pneumatic control valve has changed from an open state to a closed state.

The electronic processor can be configured to control a second compressed air source in dependence on identification of the change in the operating state of the pneumatic control valve. For example, the second compressed air source can be controlled to inflate a tire.

The pneumatic control valves can be controlled individually. The controller can be configured to control an operating state of a plurality of said pneumatic control valves sequentially.

According to a further aspect of the present invention there is provided a central tire inflation system (CTIS) for a vehicle, the CTIS comprising:
- a supply line for supplying compressed air to a tire;
- a pneumatic control valve operable in at least first and second operating states to control the supply of compressed air from the supply line to the tire;
- a first control valve connected to a first compressed air source; and
- a controller having an electronic processor as claimed in any one of the preceding claims;
- wherein the electronic processor is configured to control the first control valve to generate the pneumatic control signal for changing the operating state of a pneumatic control valve, the electronic processor being configured to output a first valve open signal to open the first control valve to initiate the pneumatic control signal; and to output a first valve close signal to the first control valve to terminate the pneumatic control signal; wherein the electronic processor is configured to output the first valve close signal upon determining that the pneumatic control valve has changed operating state.

The CTIS can comprise a pressure sensor for generating said supply-side pressure signal. The pressure sensor can be disposed in the supply line; or in a gallery in fluid communication with the supply line. The CTIS can comprise more than one pressure sensor. For example, a separate pressure sensor can be provided in each tire supply line.

The pneumatic control valve can be in an open state in said first operating state and in a closed state in said second operating state. Alternatively, the pneumatic control valve can be in a closed state in said first operating state and in an open state in said second operating state. The pneumatic control valve can be latched in said first operating state and/or said second operating state.

The CTIS can comprise a second compressed air source. The CTIS can comprise a second control valve connected to the second compressed air source. The electronic processor can be configured to output a second valve open signal to open the second control valve to supply compressed air from the second compressed air source to the tire. The second valve open signal can be output in dependence on identification of the change from said first operating state to said second operating state.

The first compressed air source can supply compressed air to control said at least one pneumatic control valve. The CTIS can comprise a second compressed air source for supplying compressed air to inflate the tire. At least in certain embodiments, the first and second compressed air sources can have different operating parameters suitable for performing the respective functions of inflating the tire(s) and generating the pneumatic control signal. The first compressed air source can operate at a higher pressure than the second compressed air source. The second compressed air source can have a higher flow rate than the first compressed air source. The first compressed air source can comprise a reservoir which can be charged by a first compressor. The second compressed air source can comprise a second compressor for supplying compressed air to inflate the tires of the vehicle. The first and second compressors may be one and the same compressor.

The CTIS can comprise a plurality of said pneumatic control valves each configured to control the supply of compressed air to a respective tire. The controller can be configured to control two or more of said pneumatic control valves simultaneously; or to control two or more of said pneumatic control valves sequentially.

According to a further aspect of the present invention there is provided a vehicle comprising a CTIS as described herein.

According to a yet further aspect of the present invention there is provided a method of controlling an operating state of a pneumatic control valve disposed in a supply line, the method comprising:
  generating a pneumatic control signal for changing an operating state of the pneumatic control valve;
  monitoring a supply-side pressure; and
  determining that the pneumatic control valve has changed operating state in dependence on detection of a change in the supply-side pressure;
  wherein the pneumatic control signal is terminated upon determining that the pneumatic control valve has changed operating state.

The method can comprise opening the first control valve to initiate the pneumatic control signal. The method can comprise closing the first control valve to terminate said pneumatic control signal. The first control valve can be closed upon determining that the pneumatic control valve has changed operating state. Alternatively, or in addition, the method can comprise closing the first control valve if the change in the operating state of the pneumatic control valve is not detected within a predefined time period.

The change in the supply-side pressure can comprise one or more of the following: a change which is greater than or equal to a defined threshold; a change which is greater than or equal to a defined proportional change; and a change in a rate of change of the supply-side pressure. The method can comprise detecting the change in the supply-side pressure within a prescribed time period.

The method can comprise identifying a change in the operating state of the pneumatic control valve in dependence on detection of a decrease in the supply-side pressure.

The method can comprise performing the method for a plurality of said pneumatic control valves. The method can comprise controlling a plurality of said pneumatic control valves sequentially.

According to a yet further aspect of the present invention there is provided a non-transitory, computer-readable storage medium storing instructions thereon that when executed by one or more electronic processors causes the one or more electronic processors to carry out the method described herein.

According to an aspect of the invention there is provided a central tire inflation system (CTIS) for inflating vehicle tires, the CTIS comprising:
  a first compressed air source;
  a gallery connected to said first compressed air source;
  a plurality of supply lines connected to said gallery for supplying compressed air to respective vehicle tires;
  a plurality of outlet valves for controlling the supply of compressed air from said gallery, each outlet valve being associated with one of said supply lines;
  a plurality of pneumatic control valves for controlling the supply of compressed air from the supply lines to the vehicle tires, each pneumatic control valve being associated with one of said vehicle tires;
  a controller comprising an electronic processor having an electrical input for receiving a gallery pressure signal; and
  an electronic memory device electrically coupled to the electronic processor and having instructions stored therein;
  wherein, to initiate inflation of the vehicle tires, the electronic processor is configured to close the outlet valves and to control the first compressed air source to pressurize the gallery; and then to open said outlet valves to connect the pressurized gallery to the supply lines.

In an embodiment the electronic processor is configured to control the first compressed air source to pressurize the gallery to a target gallery pressure. Optionally the electronic processor is configured to determine the target gallery pressure in dependence on the pressure of the vehicle tires to be inflated. Further optionally the target gallery pressure is a sum of the highest measured tire pressure and a predetermined pressure increment. In an embodiment the electronic processor is configured to measure the pressure of said vehicle tires by sequentially placing each vehicle tire in fluid communication with the gallery and monitoring the gallery pressure signal.

In an embodiment the CTIS may comprise a second compressed air source for generating a pneumatic control signal; wherein the electronic processor is configured to control a supply of compressed air from said second compressed air source to change an operating state of said pneumatic control valves. In an embodiment the electronic processor is configured to change the operating state of each said pneumatic control valve to an open state to place the associated vehicle tire in fluid communication with the gallery. Optionally wherein, after measuring the pressure of one of said vehicle tires, the electronic processor is configured to close the outlet valve associated with the supply line for that vehicle tire.

In an embodiment the outlet valves are opened simultaneously to initiate inflation of the vehicle tires.

The CTIS may comprise one or more exhaust valves for venting air from the gallery; the electronic processor being configured to close said one or more exhaust valve to pressurize the gallery.

The first compressed air source may comprise a compressor; the electronic processor being configured to continue operation of said compressor after the outlet valves have been opened to inflate the vehicle tires.

In an embodiment the vehicle comprises four wheels having vehicle tires connected to said CTIS.

In an aspect of the invention there is provided a method of controlling a central tire inflation system (CTIS) to inflate a plurality of vehicle tires, the CTIS having a gallery having a plurality of outlet valves for controlling the supply of compressed air to respective vehicle tires from a first compressed air source, the method comprising:

closing each of said outlet valves to close the gallery;
supplying compressed air from the first compressed air source to the closed gallery to pressurize the gallery; and
opening a plurality of outlet valves to connect the gallery to the vehicle tires.

In an embodiment the method comprises opening the outlet valves when the gallery is pressurized to a target gallery pressure In an embodiment the method comprises measuring the pressure of the vehicle tires to be inflated and determining the target gallery pressure in dependence on the measured tire pressures. Optionally the target gallery pressure is a sum of the highest measured tire pressure and a predetermined pressure increment.

In an embodiment of the method measuring the pressure of the vehicle tires to be inflated comprises sequentially placing those vehicle tires in fluid communication with the gallery and measuring the gallery pressure. Optionally the method comprises changing an operating state of pneumatic control valves associated with each vehicle tire to place the vehicle tires in fluid communication with the gallery. Further optionally after measuring the pressure of one of said vehicle tires, the method comprises closing the outlet valve associated with that vehicle tire In an embodiment the method comprises simultaneously opening the outlet valves to initiate inflation of the vehicle tires.

In an embodiment the method comprises providing an uninterrupted supply of compressed air to the gallery to pressure the gallery and then to inflate the vehicle tires In an embodiment a non-transitory, computer-readable storage medium storing instructions thereon that when executed by one or more electronic processors causes the one or more electronic processors to carry out the method.

As used throughout the application, the singular form of "a", "an" and "the" may include plural referents unless the context clearly dictates otherwise.

References herein to a "supply side" of the pneumatic control valve are to the side of the pneumatic control valve closest to the pressure source which supplies the compressed air to generate the pneumatic control signal. The supply side could also be referred to as a vehicle side (as opposed to a wheel side) of the pneumatic control valve.

For the avoidance of doubt, references herein to a central tire inflation system (CTIS) are to an apparatus for controlling the pressure of one or more tires.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which:

FIG. 10 is a vehicle system boundary diagram representing the CTIS shown in FIGS. 1A and 1B;

FIGS. 2A-D illustrate operation of a pneumatic control valve incorporated into the CTIS;

DETAILED DESCRIPTION OF AN EMBODIMENT

Figure 1A:
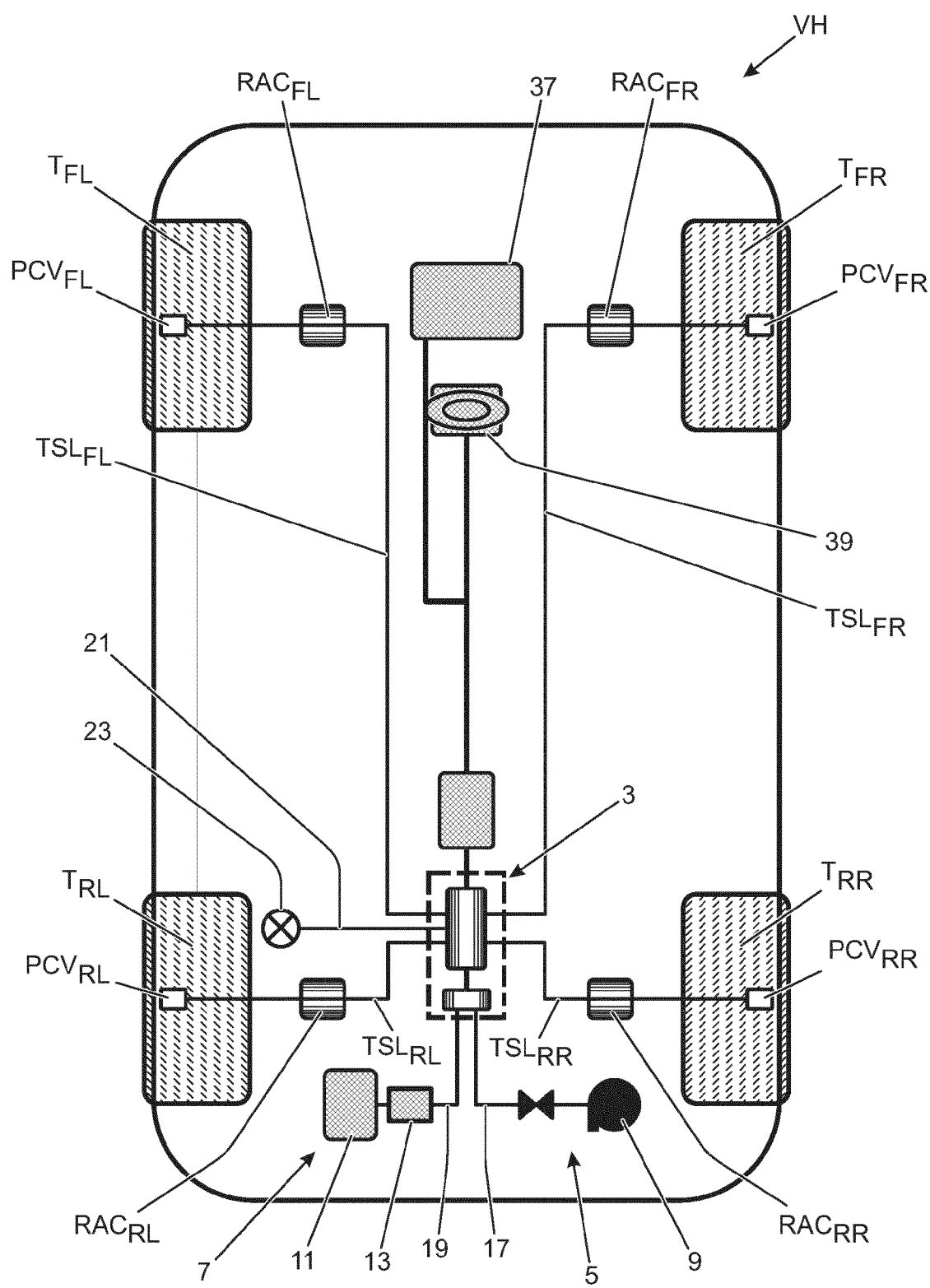
FIG. 1A is a schematic representation of a central tire inflation system (CTIS) according to an embodiment of the invention.

In the following description and in the drawings, reference letters are used to collectively or un-specifically identify equivalent or essentially equivalent components. Where necessary, a specific component in a collection of equivalent or essentially equivalent components is identified by suffixing a reference letter in subscript format.

A central tire inflation system (CTIS) 1 in accordance with an embodiment of the present invention will now be described with reference to the accompanying Figures. As shown schematically in FIG. 1A, the CTIS 1 is installed in a vehicle VH having four wheels W each having a tire T mounted on a wheel hub (not shown). The wheels W (and the tires T) are identified herein based on their relative position on the vehicle VH, namely: front left (FL), front right (FR), rear left (RL) and rear right (RR). This nomenclature is employed to identify the components of the CTIS 1 associated with the respective tires T. The front tires $T_{FR}$, $T_{FL}$ are mounted on a front axle and the rear wheels $T_{RR}$, $T_{RS}$ are mounted on a rear axle of the vehicle.

The CTIS 1 comprises four pneumatic control valves PCV fixedly mounted to the wheel hubs and arranged to control the supply of compressed air to and from a respective tire cavity. The pneumatic control valves PCV are pneumatically operated in response to changes in the pressure in the associated tire supply line TSL. Specifically, the pneumatic control valves PCV are operable to cycle sequentially (i.e. to toggle) between an open state and a closed state in dependence on application of a pressure exceeding a valve activation pressure. The pneumatic control valves PCV are stable in both the open and closed state via a latching mechanism, i.e. they can each be considered as a pressure actuated bi-stable valve. Herein the application of air at a pressure and time sufficient to switch the valve from one state to its other state, i.e. from open to closed or from closed to open, is referred to as "toggling" the valve, and the application of said air in this manner is referred to as a high pressure (pneumatic) control signal. A suitable pneumatic control valve PCV for this application is available in the form of a pneumatic latching valve from Norgren Limited of PO Box 22, Eastern Avenue, Lichfield, Staffordshire, WS13 6SB, United Kingdom. It will be appreciated that each pneumatic control valve could have additional operating states which are cycled through sequentially in dependence on said pneumatic control signal.

The CTIS 1 further comprises a valve block 3 for controlling the supply of compressed air to each of the pneumatic control valves PCV. The valve block 3 is fluidly coupled to a first compressed air source 5 and a second compressed air source 7. The first compressed air source 5 provides air at a high flow rate and low pressure (HF/LP); and the second compressed air source 7 is operable to provide air at a higher pressure. As described herein, the first and second compressed air sources 5, 7 are distinct from each other. In the present embodiment, the first compressed air source 5 comprises a first compressor 9; and the second compressed air source 7 comprises a reservoir 13 supplied by the first compressor 9. Alternatively, the first and second compressed air sources 5, 7 can comprise separate compressors which are operable independently of each other. By way of illustration, a second compressor 11 for charging the reservoir 13 is shown in phantom in FIG. 10.

The activation pressure of each said pneumatic control valve PCV is below the pressure of the second compressed air source 7. In this manner the second compressed air source 7 can be applied for a short duration to switch one or more selected pneumatic control valves PCV from a closed state to an open state, and vice versa.

An ECU 15 is provided to control operation of the CTIS 1. Specifically, the ECU 15 is configured to control operation of the valve block 3 and the first compressor 9. The ECU 15 comprises at least one electronic processor which is electrically coupled to an electronic memory device having instructions stored thereon.

A tire supply line TSL is provided to supply compressed air from the valve block 3 to each tire T. Specifically, the CTIS 1 comprises a front left tire supply line $TSL_{FL}$, a front right tire supply line $TSL_{FR}$, a rear left tire supply line $TSL_{RL}$ and a rear right tire supply line $TSL_{RR}$. The pneumatic control valves PCV are provided at the ends of the tire supply lines TSL to control the supply of compressed air to the respective tires T. A section of each tire supply line TSL extends along the respective vehicle axles to supply compressed air to the pneumatic control valves PCV mounted in each wheel hub. A rotary air coupling (RAC) is provided in each tire supply line TSL to provide a fluid coupling to supply compressed air from the valve block 3 to the section of each tire supply line TSL disposed in the vehicle axle.

The valve block 3 will now be described in more detail with reference to FIG. 1B. The valve block 3 comprises first and second inlet valves $V_{INC}$, $V_{INSS}$. The first inlet valve $V_{INC}$ operatively controls the supply of compressed air from the first compressed air source 5 which is connected to the valve block 3 by a first supply line 17. The second inlet valve $V_{INSS}$ operatively controls the supply of compressed air from the second compressed air source 7 which is connected to the valve block 3 by a second supply line 19.

The valve block 3 comprises four outlet valves (collectively referenced as $V_O$) for controlling the supply of compressed air to the respective tire supply lines TSL. In particular, the valve block 3 comprises: a front left outlet valve $V_{FLO}$ for controlling the supply of compressed air to the front left tire supply line $TSL_{FL}$; a rear left outlet valve $V_{RLO}$ for controlling the supply of compressed air to the rear left tire supply line $TSL_{RL}$; a front right outlet valve $V_{FRO}$ for controlling the supply of compressed air to the front right tire supply line $TSL_{FR}$; and a rear right outlet valve $V_{RRO}$ for controlling the supply of compressed air to the rear right air supply line $TSL_{RR}$. The outlet valves $V_O$ are operable independently of each other to enable the selective supply of compressed air to one or more of the tire supply lines TSL.

The valve block 3 also comprises first and second exhaust valves $E_1$, $E_2$ coupled to an exhaust line 21. The exhaust line 21 terminates with an exhaust outlet 23 which is open to atmosphere to vent exhaust air from the CTIS 1. The first and second exhaust valves $E_1$, $E_2$ are operable to control the flow of exhaust air to the exhaust line 21, for example during tire deflation. A safety valve $V_{SAFE}$ is also provided in the valve block 3. The safety valve $V_{SAFE}$ is operable to vent to atmosphere any excess air which might accumulate in the valve block 3 due, for example, to malfunction of any of the components of the CTIS 1.

Figure 1B:
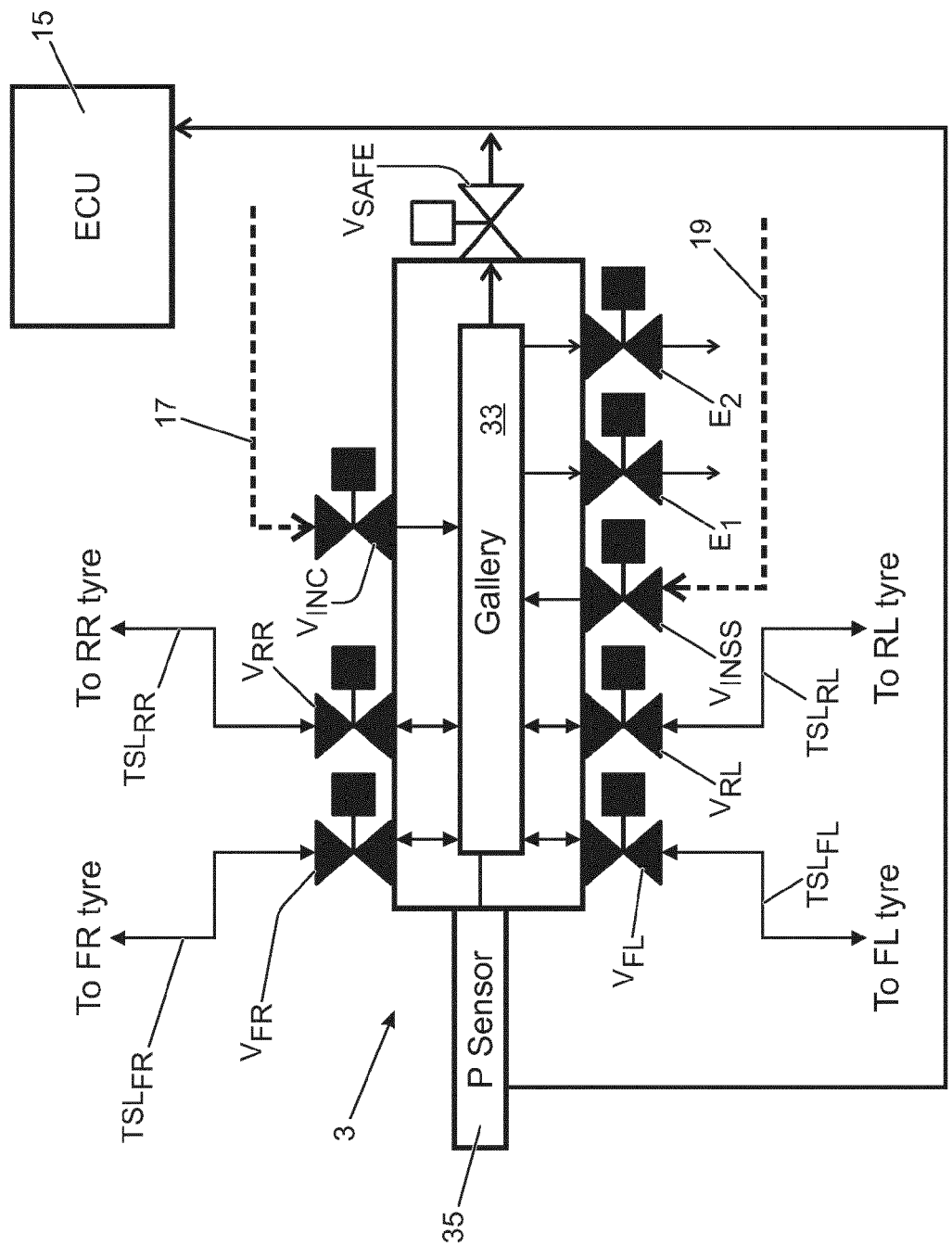
FIG. 1B is a schematic representation of a valve arrangement of the CTIS shown in FIG. 1A.

The inlet valves $V_{INC}$, $V_{INSS}$, the outlet valves $V_O$ and the exhaust valves $E_1$, $E_2$ are solenoid valves having a normally-closed configuration (illustrated by a filled symbol in FIG. 1B). The inlet valves $V_{INC}$, $V_{INSS}$, the outlet valves $V_O$ and the exhaust valves $E_1$, $E_2$ are operable independently of each other and are actuated by control signals received from the ECU 15. The safety valve $V_{SAFE}$ is also a solenoid valve but has a normally-open configuration (illustrated by an open symbol in FIG. 1B). The safety valve $V_{SAFE}$ is closed by receiving a control signal from the ECU 15.

The first and second compressed air sources 5, 7 are controlled, directly or indirectly, by the ECU 15. The first compressor 9 comprises an electric motor 27 and has an operating pressure of approximately 9 bar. A dryer unit 29 is coupled to the first compressor 9 partway through a first compressed air supply line 31 connecting the first compressor 9 to the valve block 3. The second compressed air source 7 comprises the reservoir 13 which is connected to, and charged by the first compressor 9. In use, the operating pressure of the reservoir 13 can be up to 20 bar.

A fluid gallery 33 is provided in the valve block 3. The gallery 33 is open to each of: the outlet valves $V_O$, the inlet valves $V_{INC}$, $V_{INSS}$, the exhaust valves $E_1$, $E_2$, and the safety valve $V_{SAFE}$. The valve block 3 houses a pressure sensor 35 arranged to measure the pressure in a gallery 33. The gallery 33 can be selectively placed in fluid communication with one or more of the tire supply lines TSL by opening one or more of the outlet valves $V_O$. In the present embodiment, the pressure sensor 35 measures the pressure in the individual tire supply lines TSL by placing the tire supply line TSL in fluid communication with the gallery 33. By opening the pneumatic control valve PCV associated with that tire supply line TSL, the pressure sensor 35 can measure the air pressure in the tire cavity (hereinafter referred to, for simplicity, as the tire pressure). The pressure sensor 35 measures the pressure on a supply-side of the pneumatic control valve PCV (i.e. the pressure on the side in communication with the second compressed air source 10, rather than the tire T). The pressure sensor 35 outputs a supply-side pressure signal to the ECU 15.

The gallery 33 receives compressed air from each of said first and second compressed air sources 9, 11 via the respective first and second inlet valves $V_{INC}$, $V_{INSS}$. The first inlet valve $V_{INC}$ is operable to control the supply of compressed air from the first compressed air source 5 to the gallery 33. The second inlet valve $V_{INSS}$ is operable to control the supply of compressed air from the second compressed air source 7 to the gallery 33. In use, the first compressed air source 5 is the primary source of compressed air for inflating the tires T. One or more of the tire supply lines TSL can be placed in communication with the first compressed air source 5 by opening the first inlet valve $V_{INC}$ and the appropriate outlet valves $V_O$.

The second compressed air source 7 provides a higher pressure supply which is controlled by the second inlet valve $V_{INSS}$ to generate a pneumatic control signal as described above for controlling operation of one or more of said pneumatic control valves PCV to tires for which the respective outlet valves $V_O$ are open, i.e. to toggle the valves from one stable state to the other stable state. Specifically, the second inlet valve $V_{INSS}$ is operated to generate the pneumatic control signal to cycle the pneumatic control valve(s) PCV in communication with the gallery 33. The pneumatic control valve(s) PCV cycle through their respective operating states in response to the pneumatic control signal and, therefore, can be operated to control the supply of compressed air to and from the respective tires T. By opening the pneumatic control valve(s) PCV, one or more of the tires T can be placed in communication with the respective tire supply lines TSL.

The valve block 3 can be operated to place the tire supply lines TSL in communication with the first compressed air source 5 to inflate one or more of said tires T; or in communication with the exhaust line 21 to deflate one or more of said tires T. Furthermore, the valve block 3 can be operated to measure the pressure of the air in the tires T.

The CTIS 1 according to the present embodiment uses a single pressure sensor 35 for measuring the pressure in the gallery 33. It will be appreciated that more than one pressure sensor 35 could be provided. For example, a pressure sensor 35 could be provided in communication with each tire supply line TSL. Equally, a separate valve block 3 could be provided for each tire T or for each axle.

The ECU 15 is programmed to control the overall operation of the CTIS 1. FIG. 10 illustrates the relationship between the main mechanical components of the CTIS 1 described herein (which incorporates the valve block 3 illustrated in FIG. 1B) and a vehicle control system 41. The vehicle control system 41 comprises the ECU 15. The ECU 15 is programmed to implement the control strategies and procedures described herein. In this embodiment, the ECU 15 receives from a tire pressure monitoring system (TPMS) 43, via a vehicle controller area network (CAN) 45, real-time information relating to the current tire pressures for the four tires T of the vehicle VH. The pressure sensor communicates directly with the ECU 15 via electric signals representative of the pressure measured by the pressure sensor 35 in the gallery 33 of the valve block 3. As described earlier, the pneumatic control valves PCV and the various valves V, I, E of the valve block 3 can be configured such that the pressure sensor 35 measures a pressure which is representative of the pressure inside each of the tires T. The TPMS 43 also monitors the temperature inside the tires T so that the tire pressures can be referred to a nominal temperature of 25 degrees C. using appropriate algorithms, for example a thermocouple or other thermal sensor may be located in or through the hub of each wheel.

Figure 1C:
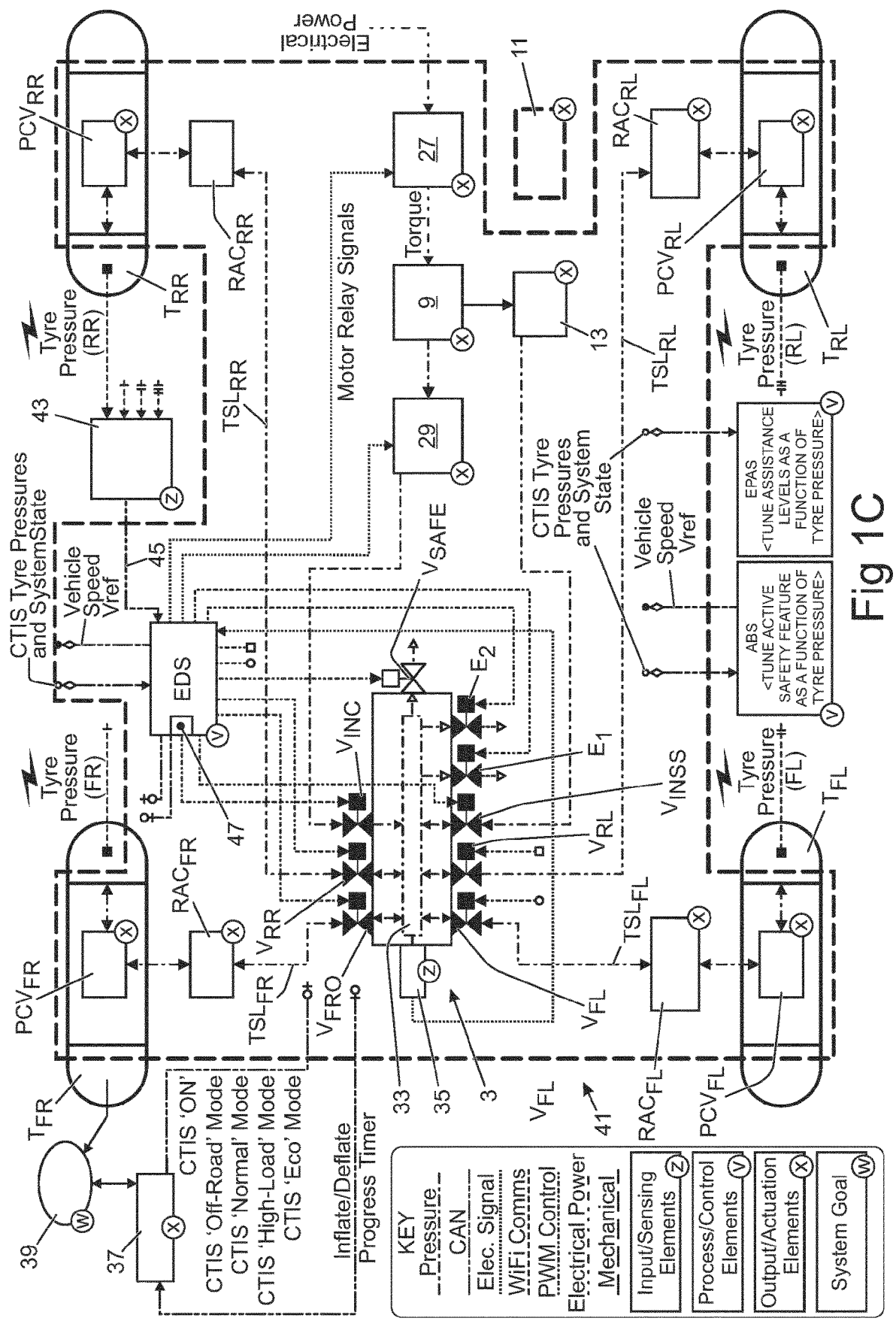

The ECU 15 controls the various mechanical components of the CTIS 1. As seen in FIG. 1C, the ECU 15 is configured to control the outlet valves $V_O$ via a pulse width modulation (PWM) control network 47. Via the same PWM control network 47, the ECU 15 also controls the purging function of the dryer unit 29, the electric motor 27 which drives the first compressor 9, the first and second inlet valves $V_{INC}$, $V_{INSS}$, the exhaust valves $E_1$, $E_2$ and the safety valve $V_{SAFE}$. As an alternative to PWM control full cycle on/off solenoid valves could be used. The ECU 15 outputs open and close signals to open and close the first and second inlet valves $V_{INC}$, $V_{INSS}$.

The pneumatic control valve is disposed in a hub of the vehicle wheel. In the present embodiment, the pneumatic control valve PCV is a pneumatic latching valve which can be selectively opened and closed in response to the application of a pneumatic control signal. With reference to FIGS. 2A-D, the pneumatic control valve PCV has an axial inlet port 49 and a radial outlet port 51. The outlet port 51 is connected to a transfer line (not shown) formed in a spoke of the wheel to establish fluid communication with the tire T. As described herein, the pneumatic control valve PCV can be selectively opened and closed to control the flow of compressed air between the inlet port 49 and the outlet port 51.

The pneumatic control valve PCV comprises a valve member 53 and a latch mechanism 55 disposed within a valve chamber 57. The valve member 53 and the latch mechanism 55 are movable axially within the valve chamber 57 to control the operating state of the pneumatic control valve PCV. The valve member 53 is arranged to cooperate with a first valve seat 59 formed at the inlet port 49; and a second valve seat 61 formed on the latch mechanism 55. A valve spring 63 is provided for loading the valve member 53. The latch mechanism 55 comprises a latching member 65 and a latch spring 67. In response to a pneumatic control signal supplied to the pneumatic control valve PCV through the tire supply line TSL, the latching member 61 is disposed sequentially in first, second, third and fourth positions.

With reference to FIG. 2A, during a normal running mode the valve member 53 is displaced to its closed position under the action of the valve spring 63 and the fluid pressure from the tire side. The pneumatic control valve PCV is in a closed operating state in which the pressure of the tire 3 is maintained. The latching member 65 is in a first position when the pneumatic control valve PCV is operating in the normal running mode, as shown in FIG. 2A. To change the operating state of the pneumatic control valve PCV to an open state for inflating the tire T, a pneumatic control signal is supplied to the inlet port 49 of the pneumatic control valve PCV. As shown in FIG. 2B, the valve member 53 is displaced against the action of the valve spring 63 (to the right in the illustrated arrangement). The latching member 65 is displaced to a second position against the action of the latch spring 67. The valve member 53 is thereby lifted from the first and second valve seats 59, 61 allowing compressed air to flow through the pneumatic control valve PCV (as illustrated by the arrow overlaid onto FIG. 2B). The tire 3 can be inflated to a required pressure with the pneumatic control valve PCV in this configuration. The axial displacement of the latching member 65 causes it to rotate. When the pressure in the tire supply line TSL is reduced, for example when the pneumatic control signal is terminated or inflation of the tire is completed, the latching member 65 is displaced to a third position against the action of the latch spring 67, as shown in FIG. 2C. In this configuration, air can be vented from the tire T through the tire supply line TSL (as illustrated by the arrow overlaid onto FIG. 2C) by reducing the pressure in the tire supply line TSL, for example by venting the gallery 33 to atmosphere. In this configuration, the tire T can be deflated or the tire pressure measured by the pressure sensor 35. To reset the pneumatic control valve PCV, a pneumatic control signal is supplied to the inlet port 49 (as illustrated by the arrow overlaid onto FIG. 2D). The valve member 53 and the latching member 65 are displaced against the action of the valve spring 63 and the latch spring 67 (to the right in the illustrated arrangement). When the valve member 53 and the latching member 65 are displaced by the pneumatic control signal, the tire T can be inflated by continuing the supply of compressed air to the inlet port 49. When the pneumatic control signal terminates, the valve member 53 and the latching member 65 are displaced to their starting position under the action of the valve spring 63 and the latch spring 67. The operating state of the pneumatic control valve PCV is thereby changed to a closed state, as shown in FIG. 2A.

As outlined above, the second compressed air source 7 generates the pneumatic control signal(s) for controlling operation of one or more of said pneumatic control valves PCV. In particular, an operating state of the pneumatic control valve PCV can change in dependence on the pneumatic control signal. For example, the pneumatic control valve PCV can change from a closed state to an open state and vice versa. The pneumatic control valve PCV can be latched in said closed state to provide a normal operating mode in which the tire T is sealed. The pneumatic control valve PCV can change from the latched closed state to an open state. Once the pneumatic control valve PCV is unlatched from said closed state, the tire T can be inflated by supplying compressed air through the tire supply line TSL. When the pneumatic control signal ends, the reduction in the pressure in the tire supply line TSL causes the pneumatic control valve PCV to latch in the open state. The tire T can be deflated and/or the tire pressure measured when the pneumatic control valve PCV is latched in said open state. The pneumatic control valve PCV can be returned to the closed state by applying a further pneumatic control signal. The pneumatic control signal resets the pneumatic control valve PCV and latches the pneumatic control valve PCV in the closed state to allow operation in the normal operating mode.

The pressure required to change the operating state of the pneumatic control valves PCV depends on the pressure in the associated tire T. For example, when changing from a closed state to an open state, the pneumatic control signal must increase the pressure in the tire supply line TSL to overcome the pressure in the tire. The pneumatic control valve PCV may optionally comprise a spring mechanism acting on the valve member and the pneumatic control signal will also have to overcome a spring bias applied by the spring mechanism. Thus, a high tire pressure will require that a higher pressure is established in the tire supply line TSL to actuate the pneumatic control valves PCV. The pressure in the reservoir 13 will determine the time taken to establish a sufficient pressure differential across the pneumatic control valve PCV (i.e. between the tire supply line TSL and the pressure in the tire) to actuate the pneumatic control valves PCV. A relatively low pressure in the reservoir 13 will result in a slower increase in the pressure in the tire supply line TSL, thereby extending the time taken to actuate the pneumatic control valves PCV.

Figure 3:
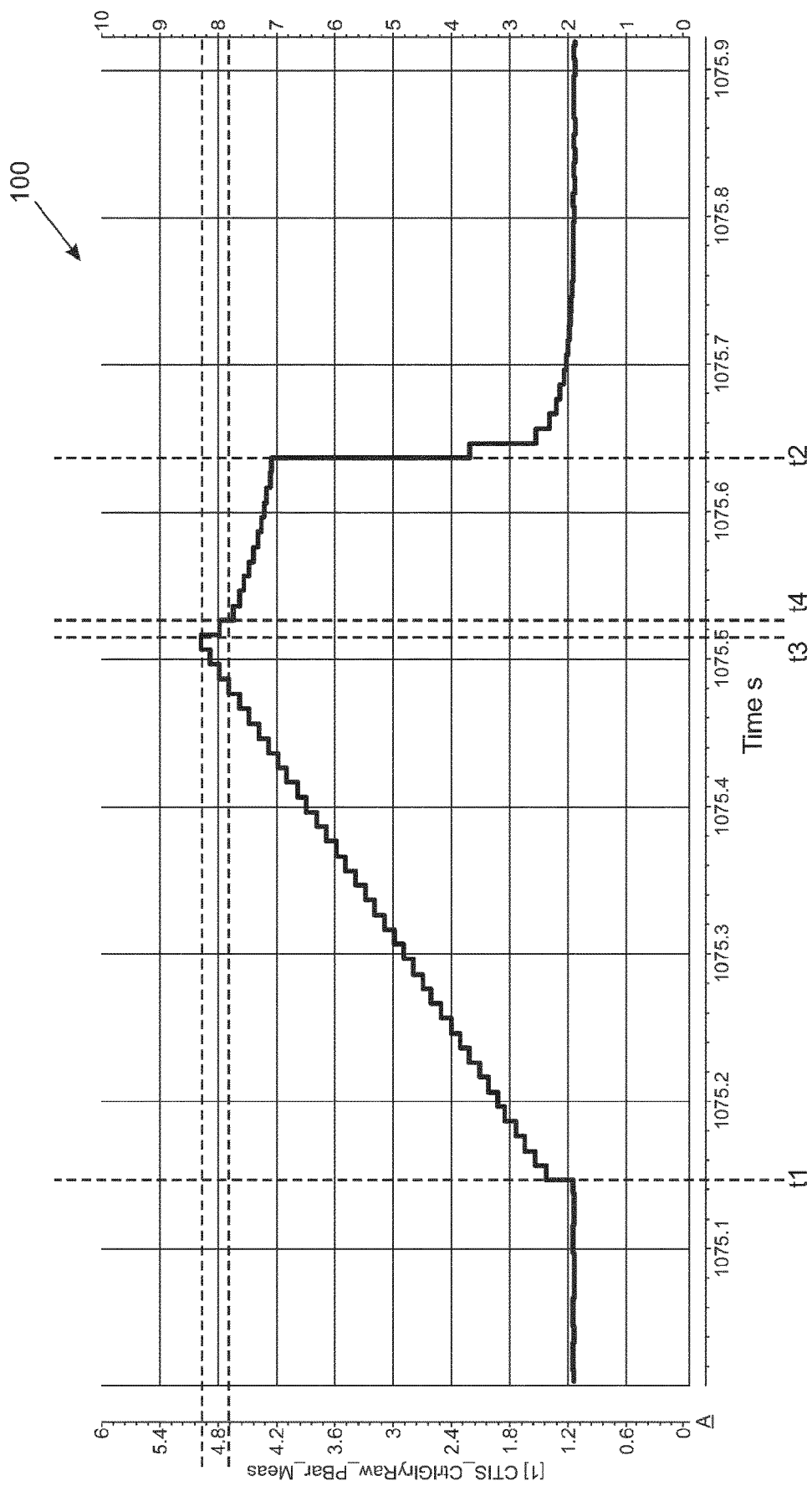
FIG. 3 shows a first graph for operation of a pneumatic control valve in dependence on a pneumatic control signal having a fixed duration.

One control strategy to ensure that the pneumatic control valve PCV changes from a closed state to an open state would be to generate a pneumatic control signal sufficient to actuate the pneumatic control valve PCV assuming a relatively high tire pressure and a relatively low pressure in the reservoir 13 (i.e. a worst-case scenario). The second inlet valve $V_{INSS}$ could be controlled to generate a pneumatic control signal having a predefined duration, for example a time of 0.5 seconds. With reference to FIG. 3, a first graph 100 represents the pressure in the gallery 33 when the operating state of the pneumatic control valve PCV changes from a closed stated to an open state. The second inlet valve $V_{INSS}$ is opened to initiate a pneumatic control signal at a first time t1; and is closed to terminate the pneumatic control signal at a second time t2. The duration of the pneumatic control signal is fixed at 0.5 seconds irrespective of the status of the pneumatic control valve PCV. The pneumatic control signal results in a progressive increase in the pressure in the gallery 33 until a sufficient pressure differential is established to actuate the pneumatic control valve PCV. In the operating cycle illustrated in FIG. 3, the pneumatic control valve PCV changes from the closed state to the open state at a third time t3, as indicated by a drop in the pressure in the gallery 33. It will be appreciated that the pneumatic control signal continues after the pneumatic control valve PCV changes to said open state. A potential disadvantage of this control strategy is that the pressure in the reservoir 13 can be reduced unnecessarily.

Furthermore, it has been recognized that the compressed air supplied from the reservoir 13 to generate the pneumatic control signals to change the operating state of the pneumatic control valve PCV depends on the nature of the change. During a transition from an open operating state to a closed operating state, the pneumatic control valve PCV closes in dependence on the pneumatic control signal and inhibits the continued supply of air from the reservoir 13 to the tire T. However, during the transition from a closed operating state to an open operating state, for example to inflate the tires T, the pneumatic control valve PCV opens to establish a fluid connection between the tire supply line TSL and the tire T. The compressed air supplied by the reservoir 13 in the form of the pneumatic control signal can then flow into the tire T. It will be appreciated, therefore, that the change from a closed operating state to an open operating state tends to result in a larger drop in pressure in the reservoir 13.

The ECU 15 in accordance with the present embodiment is configured to control operation of the pneumatic control valves PCV to help reduce the duration of the pneumatic control signals, thereby reducing the drop in pressure in the reservoir 13 and potentially reducing operation of the first compressor 9 (or a second compressor if the second compressed air source 7 utilizes a separate compressor to replenish pressure in the reservoir 13). In particular, the ECU 15 is configured to identify a change in the operating state of the pneumatic control valve(s) PCV and to control operation of the second inlet valve $V_{INSS}$ in dependence on the identified change in operating state. The ECU 15 receives a pressure measurement signal from the pressure sensor 35. The pressure sensor 35 measures the pressure in the gallery 33 which corresponds to the pressure on a supply side of the pneumatic control valve PCV (i.e. the pressure on the side of the pneumatic control valve PCV closest to the second pressure source 13 which supplies the compressed air to generate the pneumatic control signal). As outlined above, a change in the operating state of the pneumatic control valve(s) PCV results in a change in the pressure in the tire supply lines TSL. When the pneumatic control valve PCV changes from a closed state to an open state, there is an identifiable drop in the pressure in the associated tire supply line TSL (and in the gallery 33). Conversely, when the pneumatic control valve PCV changes from an open state to a closed state, there is an identifiable increase in the pressure in the associated tire supply line TSL (and in the gallery 33). By monitoring the pressure in the gallery 33, the ECU 15 can identify a change in pressure indicative of a change in the operating state of the pneumatic control valve(s) PCV. The ECU 15 can thereby identify when the operating state of the pneumatic control valve(s) PCV changes.

In the present embodiment, the ECU 15 is configured to identify the peak pressure measured by the pressure sensor 35 in the gallery 33. If the peak pressure decreases by a predetermined pressure, the ECU 15 determines that the pneumatic control valve PCV has changed from a closed state to an open state. The predetermined pressure in the present embodiment is set as 0.25 bar, but this value can be calibrated for different systems. Thus, in the scenario illustrated in FIG. 3, the ECU 15 would determine at a fourth time t4 that the pneumatic control valve PCV has changed from said closed state to said open state. Alternatively, or in addition, the predetermined pressure may vary depending on whether the pneumatic control valve PCV is associated with the front axle or the rear axle of the vehicle.

The ECU 15 is configured to control operation of the second inlet valve $V_{INSS}$ in dependence on the identification of a change in the operating state of the pneumatic control valve(s) PCV. Specifically, upon identifying that the operating state of the pneumatic control valve(s) PCV has changed, the ECU 15 outputs a control signal to close the second inlet valve $V_{INSS}$, thereby terminating the pneumatic control signal.

The ECU 15 can also implement a failsafe strategy. For example, if the predetermined pressure decrease is not detected within a predefined cut-off time period (measured from opening the second inlet valve $V_{INSS}$ to initiate the pneumatic control signal), the ECU 15 can output a control signal to close the second inlet valve $V_{INSS}$. By way of example, the cut-off time period could be set as 0.6 seconds. If the ECU 15 determines that the operating state of the pneumatic control valve PCV has not changed, the procedure can be repeated. If the pneumatic control valve PCV does not respond in the expected manner, the ECU 15 can be configured to output a fault signal. For example, the process could be repeated five (5) times and then a fault signal output.

The ECU 15 can be configured to change the operating states of the pneumatic control valves PCV associated with each of the tires T in sequence. By way of example, the ECU 15 can be configured to change the pneumatic control valves PCV from a closed state to an open state in the following sequence: front left (FL), front right (FR), rear left (RL) and rear right (RR).

Figure 4:
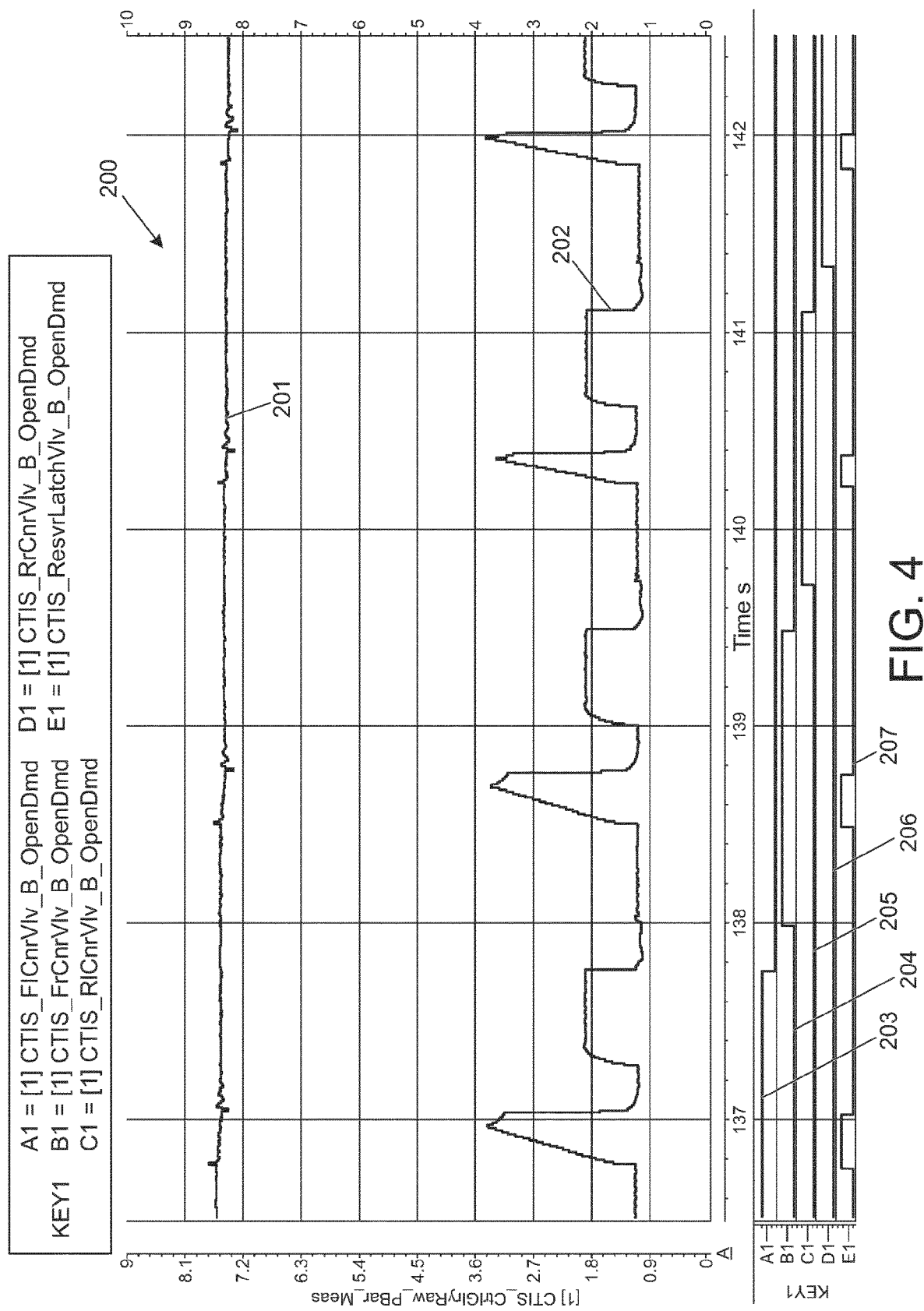
FIG. 4 shows a second graph for operation of a pneumatic control valve in dependence on a pneumatic control signal generated in dependence on a detected pressure change.

With reference to FIG. 4, the operation of the CTIS 1 based on a tire pressure of 0.8 bar is represented in a second graph 200. The ECU 15 is configured to change the operating state of the pneumatic control valves PCV sequentially in this embodiment. A first plot 201 represents the pressure in the reservoir 13; and a second plot 202 represents the pressure in the gallery 33. The operating state of the outlet valves $V_{FL}$, $V_{FR}$, $V_{RL}$, $V_{RR}$ are represented by third, fourth, fifth and sixth plots 203, 204, 205, 206 respectively (a "1" indicating that the valve is open and a "0" indicating that the valve is closed). A seventh plot 207 represents the operating state of the second inlet valve $V_{INSS}$ controlled by the ECU 15 in accordance with the strategy described herein. In particular, the ECU 15 identifies a pressure drop of at least 0.25 bar from a peak pressure measured in the gallery 33 and determines that the pneumatic control valve has changed from a closed state to an open state. The ECU 15 outputs a control signal to close the second inlet valve $V_{INSS}$, thereby inhibiting the supply of compressed air from the reservoir 13 after the operating state of the pneumatic control valve PCV has changed. As the pneumatic control valve PCV is changed to an open state, the pressure in the gallery 33 increases to match the tire pressure. The corresponding outlet valve $V_O$ is closed and the process is repeated for the next pneumatic control valve PCV in the sequence. In the example illustrated in FIG. 4, the duration of the pneumatic control signals to change the operating state of each pneumatic control valve PCV is as follows: front left (FL) 0.279 seconds, front right (FR) 0.289 seconds, rear left (RL) 0.15 seconds and rear right (RR) 0.17 seconds. The progressive decrease in the pressure of the reservoir 13 is represented by the first plot 201.

Figure 5:
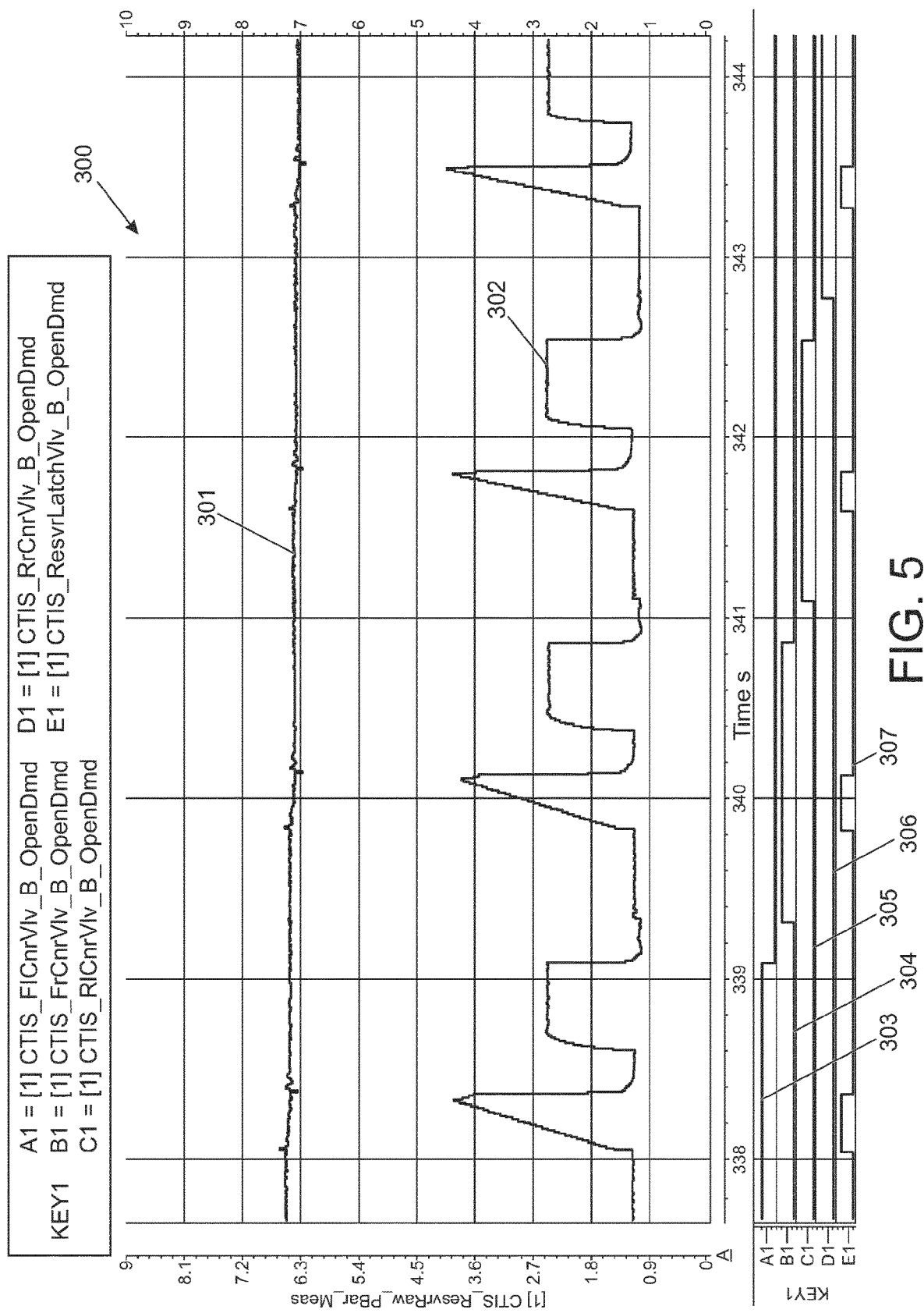
FIG. 5 shows a third graph for operation of a pneumatic control valve in dependence on a pneumatic control signal generated in dependence on a detected pressure change.

With reference to FIG. 5, the operation of the CTIS 1 based on a tire pressure of 1.4 bar is represented in a third graph 300. A first plot 301 represents the pressure in the reservoir 13; and a second plot 302 represents the pressure in the gallery 33. The operating state of the outlet valves $V_{FL}$, $V_{FR}$, $V_{RL}$, $V_{RR}$ are represented by third, fourth, fifth and sixth plots 303, 304, 305, 306 respectively. A seventh plot 307 represents the operating state of the second inlet valve $V_{INSS}$ controlled by the ECU 15 in accordance with the strategy described herein. In particular, the ECU 15 identifies a pressure drop of at least 0.25 bar from a peak pressure measured in the gallery 33 and determines that the pneumatic control valve has changed from a closed state to an open state. The ECU 15 outputs a control signal to close the second inlet valve $V_{INSS}$, thereby inhibiting the supply of compressed air from the reservoir 13 after the operating state of the pneumatic control valve PCV has changed. As the pneumatic control valve PCV is changed to an open state, the pressure in the gallery 33 increases to match the tire pressure. The corresponding outlet valve $V_O$ is closed and the process is repeated for the next pneumatic control valve PCV in the sequence. In the example illustrated in FIG. 5, the duration of the pneumatic control signals to change the operating state of each pneumatic control valve PCV is as follows: front left (FL) 0.32 seconds, front right (FR) 0.31 seconds, rear left (RL) 0.22 seconds and rear right (RR) 0.23 seconds. The progressive decrease in the pressure of the reservoir 13 is represented by the first plot 301.

Figure 6:
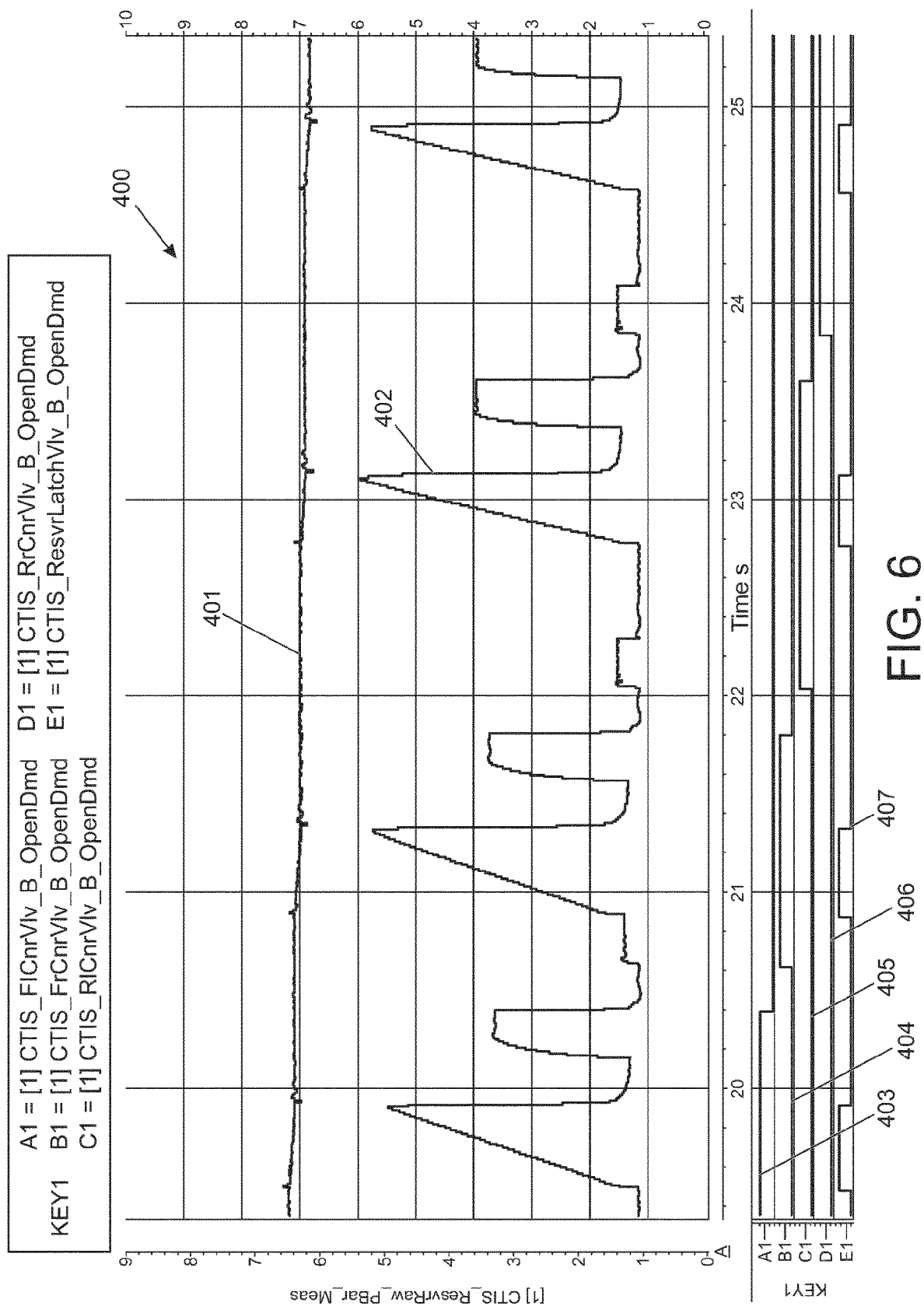
FIG. 6 shows a fourth graph illustrating operation of a pneumatic control valve in dependence on a pneumatic control signal generated in dependence on a detected pressure change.

With reference to FIG. 6, the operation of the CTIS 1 based on a front tire pressure of 2.3 bar and a rear tire pressure of 2.5 bar is represented in a fourth graph 400. A first plot 401 represents the pressure in the reservoir 13; and a second plot 402 represents the pressure in the gallery 33. The operating state of the outlet valves $V_{FL}$, $V_{FR}$, $V_{RL}$, $V_{RR}$ are represented by third, fourth, fifth and sixth plots 403, 404, 405, 406 respectively. A seventh plot 407 represents the operating state of the second inlet valve $V_{INSS}$ controlled by the ECU 15 in accordance with the strategy described herein. In particular, the ECU 15 identifies a pressure drop of at least 0.25 bar from a peak pressure measured in the gallery 33 and determines that the pneumatic control valve has changed from a closed state to an open state. The ECU 15 outputs a control signal to close the second inlet valve $V_{INSS}$, thereby inhibiting the supply of compressed air from the reservoir 13 after the operating state of the pneumatic control valve PCV has changed. As the pneumatic control valve PCV is changed to an open state, the pressure in the gallery 33 increases to match the tire pressure. The corresponding outlet valve $V_O$ is closed and the process is repeated for the next pneumatic control valve PCV in the sequence. In the example illustrated in FIG. 6, the duration of the pneumatic control signals to change the operating state of each pneumatic control valve PCV is as follows: front left (FL) 0.43 seconds, front right (FR) 0.45 seconds, rear left (RL) 0.36 seconds and rear right (RR) 0.34 seconds. The progressive decrease in the pressure of the reservoir 13 is represented by the first plot 401.

It will be appreciated that the operation of the ECU 15 can account for variations in the configuration of the CTIS 1. The control strategy described herein automatically allows for differences in the length of the tire supply lines for each tire T, or for the tires on each axle. For example, in the CTIS 1 described herein with reference to FIGS. 4, 5 and 6, the tire supply lines TSL for the rear tires $T_{RS}$, $T_{RR}$ are shorter than the tire supply lines TSL for the front tires $T_{FL}$, $T_{FR}$ due to the location of the valve block 3. The ECU 15 allows for these variations without the need for separate calibration steps.

When a pneumatic control valve PCV is in an open state, the tire T is placed in fluid communication with the associated tire supply line TSL. The outlet valves VO can be actuated to control the supply of compressed air to the tire T from the first compressed air source 5. The CTIS 1 can be configured to inflate a single tire T, for example to inflate several of the tires T sequentially. Alternatively, or in addition, the CTIS 1 can inflate a plurality of the tires T simultaneously. A potential problem may arise if multiple tires T are inflated simultaneously since the tires T may be at different pressures when the inflation is initiated. If the pressure of one or more tire T is relatively high (i.e. at a higher pressure than one or more of the other tires T), the pressure in the gallery 33 will increase when the outlet valve VO for said one or more tire T open. This increase in pressure could potentially be sufficient to actuate the pneumatic control valves PCV associated with one or more of the other tires T which has a lower pressure initially. If the difference in tire pressures is significant (for example greater than 0.5 bar), the tire T with the highest pressure could change the state of the pneumatic control valve PCV associated with the tire T having the lowest tire pressure. The change in state could reset the pneumatic control valve PCV, thereby changing the operating state from an open state to a closed state. In the closed state, the pneumatic control valve PCV will inhibit the supply of compressed air to the associated tire T, thereby preventing inflation of that tire T. In this scenario, the tire T with the lowest tire pressure would not be inflated. By way of example, if the front left tire TFL is at a significantly higher pressure than the front right tire TFR, opening the front left and front right outlet valves VFLO, VFRO simultaneously to inflate both the front left and the front right tires TFL, TFR could result in a pressure increase in the tire supply line TSL for the front right tire TFR. The pressure increase could be sufficient to actuate the pneumatic control valve PCV associated with the front left tire TFL and change its operating state from an open state to a closed state. The problem may be compounded due to the different operating pressures of the tires T on the front and rear axles, for example if all of the tires T are inflated simultaneously.

The CTIS 1 is configured to reduce the possibility of unintentional operation of one or more of the pneumatic control valves PCV when the inflation of multiple tires is initiated. In particular, the ECU 15 is configured to operate the first compressor 10 to increase the pressure in the gallery 33 above that of the pressures of the tires T to be inflated. The pressure of each of the tires T to be inflated is measured independently to determine the current tire pressures. Once the tire pressure has been measured for each tire T, the outlet valve VO associated with that tire T is closed. The pneumatic control valve PCV is held in its open state when the outlet valve VO is closed. This sequence is repeated for each tire T to ensure that the pneumatic control valves PCV are all in the same operating state (i.e. their open states). Having measured the pressure of each of the tires T, the ECU 15 identifies a maximum tire pressure PMAX corresponding to the pressure of the tire T having the highest pressure. The ECU 15 calculates a target gallery pressure PTAR based on the maximum tire pressure PMAX. In the present embodiment, the target gallery pressure PTAR is the maximum tire pressure PMAX plus a predetermined pressure increment.

The ECU 15 is configured to control the CTIS 1 to pressurize the gallery 33 to the target gallery pressure PTAR. The ECU 15 closes the exhaust valves E1, E2 to close the gallery 33, thereby forming a closed volume. The first compressor 10 is operated to pressurize the gallery 33. When the pressure sensor 35 determines that the pressure in the gallery 33 equals the target gallery pressure PTAR, the outlet valves VO associated with the tires T to be inflated are opened simultaneously. The compressed air in the gallery 33 enters the tire supply lines TSL for each tire to be inflated and opens the associated pneumatic control valves PCV. The first compressor 10 continues to supply compressed air to the tire supply lines TSL via the gallery 33. The continued supply of compressed air holds the pneumatic control valves PCV open and the tires T are inflated simultaneously. By increasing the pressure in the gallery 33 to the target gallery pressure PTAR, the pneumatic control valves PCV are opened when the outlet valves VO are opened to enable the tires T to be inflated. The risk of the operating state of one or more of the pneumatic control valves PCV changing when the outlet valves VO open is reduced.

In the present embodiment, the pressure increment added to the maximum tire pressure PMAX is set as 3.5 bar. However, the pressure increment can be calibrated, for example for use in different vehicle configurations. The target gallery pressure PTAR is set to ensure that the gallery pressure is sufficient to ensure that each pneumatic control valve PCV operates correctly. This is balanced against a desire to minimize operation of the first compressor 10 in order to reduce energy consumption and noise vibration harshness (NVH).

Figure 7:
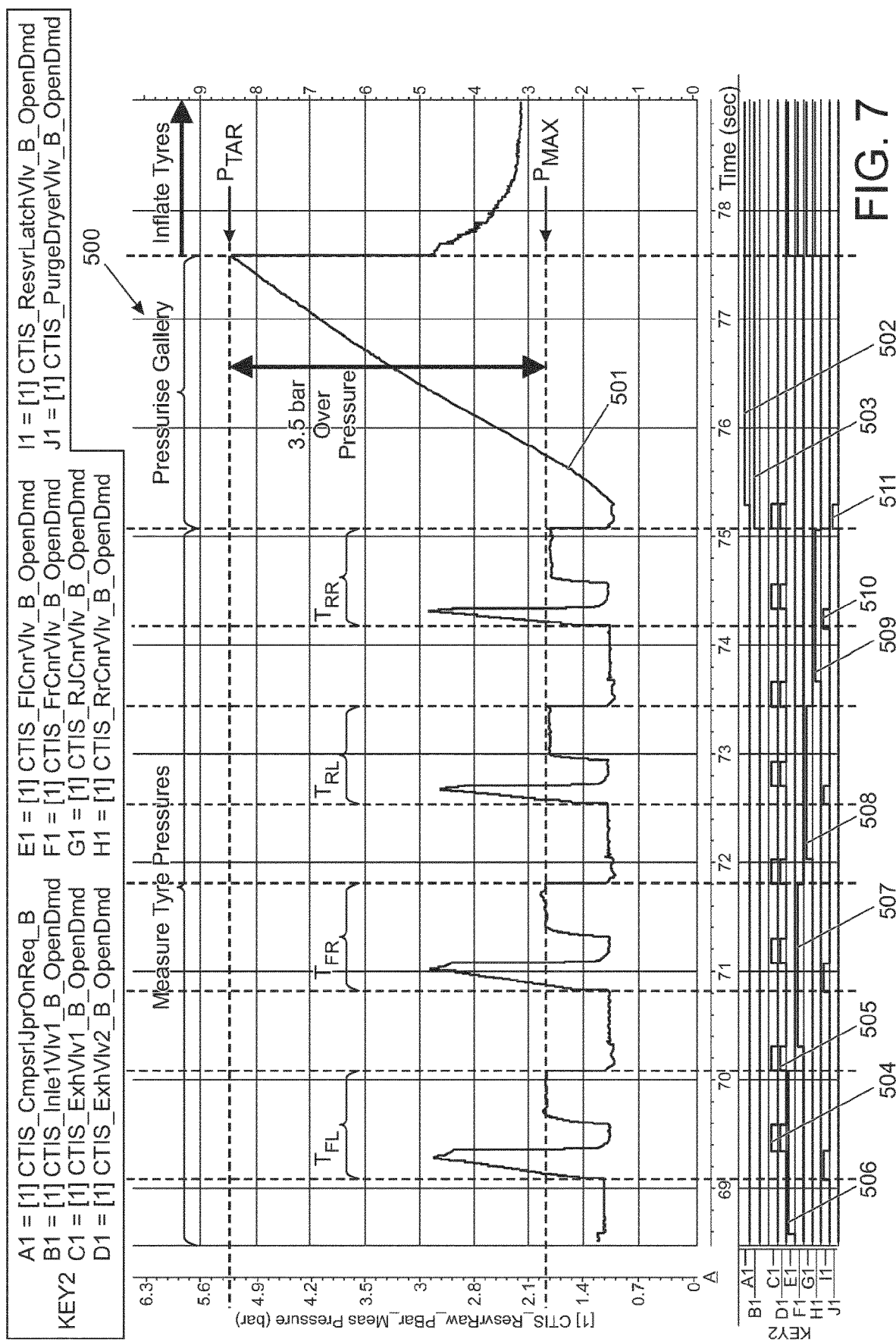
FIG. 7 shows a fifth graph illustrating operation of the CTIS to control the pneumatic control valve shown in FIGS. 2A-D in accordance with an embodiment of the present invention.

The operation of the CTIS 1 will now be described with reference to a fifth graph 500 shown in FIG. 7. A first plot 501 represents the pressure in the gallery 33 measured by the pressure sensor 35. A second plot 502 represents an operating mode of the first compressor 10 (a "0" indicating that the first compressor 10 is inactive; and a "1" indicating that the first compressor 10 is active). A third plot 503 represents the operating state of the first inlet valve VINC. Fourth and fifth plots 504, 505 represent the operating states of the first and second exhaust valves E1, E2 respectively (a "0" indicating that the exhaust valves E1, E2 are closed; and a "1" indicating that the exhaust valves E1, E2 are open). The first and second exhaust valves E1, E2 are operated in unison so the fourth and fifth plots 504, 505 have the same profile. The operating state of the outlet valves VFL, VFR, VRL, VRR are represented by sixth, seventh, eighth and ninth plots 506, 507, 508, 509 respectively (a "1" indicating that each valve is open; and a "0" indicating that each valve is closed). A tenth plot 510 represents the operating state of the second inlet valve VINSS (a "1" indicating that each valve is open; and a "0" indicating that each valve is closed); and an eleventh plot 511 represents the operating state of a purge dryer valve (not shown).

The pneumatic control valves PCV for each tire T are initially latched in a closed state. The ECU 15 operates to change each of the pneumatic control valves PCV to their respective open states. The outlet valves VFL, VFR, VRL, VRR are operated sequentially to change the operating state of each pneumatic control valve PCV. When each outlet valves VFL, VFR, VRL, VRR is open, the second inlet valve VINSS is opened to generate a pneumatic control signal. The pneumatic control signal changes the operating state of the pneumatic control valve PCV from the closed state to an open state. The second inlet valve VINSS is then closed to terminate the pneumatic control valve. The first and second exhaust valves E1, E2 are opened to vent air from the gallery 33 and then closed. When the pneumatic control valve PCV is in its open state, the associated tire T is placed in fluid communication with the gallery 33 thereby allowing the pressure of that tire T to be measured by the pressure sensor 35 and recorded by the ECU 15. The outlet valve VO is then closed; and the first and second exhaust valves E1, E2 opened to vent air from the gallery 33. The pneumatic control valve PCV is thereby held in its open position. This procedure is performed for all of the tires T so that the pneumatic control valves PCV associated with the tires T to be inflated are all in their open states. In the present embodiment, the pressure sensor 35 measures the tire pressure and the ECU 1 opens the pneumatic control valves in the following sequence: front left tire TFL, front right tire TFR, rear left tire RFL and rear right tire TRR. Once the sequence has been completed, the pneumatic control valves PCV are all in the same state and the pressure sensor 35 has measured the pressure of each tire T. The ECU 15 compares the measured tire pressures and identifies the maximum tire pressure PMAX. The ECU 15 then determines the target gallery pressure PTAR by adding the predetermined pressure increment to the maximum tire pressure PMAX.

The ECU 15 controls the CTIS 1 to pressurize the gallery 33 to the target gallery pressure PTAR. The first and second inlet valves VINC, VINSS are closed and held in their closed state. The first and second exhaust valves E1, E2 and the purge dryer valve are opened simultaneously to vent the gallery 33. The first and second exhaust valves E1, E2 and the purge dryer valve are then closed, thereby closing the gallery 33. The first compressor 10 is activated to pressurize the gallery 33, as represented by the first plot 501. The pressure sensor 35 measures the pressure in the gallery 33 and when the gallery reaches the determined target gallery pressure PTAR the ECU 15 operates simultaneously to open all of the outlet valves VFL, VFR, VRL, VRR to begin inflation of all of the tires T at the same time. As the pressure in the gallery 33 is greater than the maximum tire pressure PMAX, the likelihood of one or more of the pneumatic control valves PCV changing state unintentionally is reduced. The continued supply of compressed air from the first compressed air source 10 maintains the pneumatic control valves PCV open and inflates the tires T.

The target gallery pressure PTAR in the embodiment described herein is determined by adding the maximum tire pressure PMAX and a predetermined pressure increment. It will be understood that other techniques can be used to determine the target gallery pressure PTAR. The pressure increment could be a variable, for example calculated in dependence on the measured tire pressures.

It will be appreciated that various changes and modifications can be made to the method and apparatus described herein without departing from the scope of the present application.

The invention claimed is:

1. A controller for controlling a pneumatic control latching valve, the controller comprising:
   an electronic processor having an electrical input for receiving a supply-side pressure signal; and
   an electronic memory device electrically coupled to the electronic processor and having instructions stored therein;
   the electronic processor being configured to control a first control valve to generate a pneumatic control signal that changes an operating state of a pneumatic control latching valve, the electronic processor being configured to output a first valve open signal to open the first control valve to initiate the pneumatic control signal and thereby change the operating state of the pneumatic control latching valve, and to output a first valve close signal to close the first control valve to terminate said pneumatic control signal and cause the pneumatic control latching valve to latch;
   wherein the electronic processor is configured to monitor the supply-side pressure signal and to identify a change in the operating state of the pneumatic control latching valve in dependence on a change in the supply-side pressure;

the electronic processor being configured to output said first valve close signal upon determining that the pneumatic control latching valve has changed operating state thereby terminating the pneumatic control signal and causing the pneumatic control latching valve to latch in the changed operating state.

2. A controller as claimed in claim 1, wherein the first valve close signal is output if the change in the operating state of the pneumatic control latching valve is not detected within a predefined time period.

3. A controller as claimed in claim 1, wherein the change in the supply-side pressure comprises: a change which is greater than or equal to a defined threshold; or a change which is greater than or equal to a defined proportional change; or change in the rate of change of the supply-side pressure.

4. A controller as claimed in claim 3, wherein the electronic processor is configured to detect the change in the supply-side pressure within a prescribed time period.

5. A controller as claimed in claim 1, wherein the electronic processor is configured to identify when the pneumatic control latching valve changes operating state in dependence on detection of a decrease in the supply-side pressure.

6. A controller as claimed in claim 1 configured to control an operating state of a plurality of said pneumatic control latching valves.

7. A controller as claimed in claim 6, wherein the controller is configured to control two or more of said pneumatic control latching valves simultaneously; or to control two or more of said pneumatic control latching valves sequentially.

8. A central tire inflation system (CTIS) for a vehicle, the CTIS comprising:
a supply line for supplying compressed air to a tire;
a pneumatic control latching valve operable in at least first and second operating states to control the supply of compressed air from the supply line to the tire;
a first control valve connected to a first compressed air source; and
a controller having an electronic processor having an electrical input for receiving a supply-side pressure signal, and an electronic memory device electrically coupled to the electronic processor and having instructions stored therein;
wherein the electronic processor is configured to control the first control valve to generate the pneumatic control signal that changes the operating state of a pneumatic control latching valve, the electronic processor being configured to output a first valve open signal to open the first control valve to initiate the pneumatic control signal and thereby change the operating state of the pneumatic control latching valve; and to output a first valve close signal to the first control valve to terminate the pneumatic control signal and cause the pneumatic control latching valve to latch;
wherein the electronic processor is configured to monitor the supply-side pressure signal and to identify a change in the operating state of the pneumatic control valve in dependence on a change in the supply-side pressure; and
wherein the electronic processor is configured to output the first valve close signal upon determining that the pneumatic control latching valve has changed operating state thereby terminating the pneumatic control signal and causing the pneumatic control latching valve to latch in the changed operating state.

9. A CTIS as claimed in claim 8 comprising a pressure sensor for generating said supply-side pressure signal.

10. A CTIS as claimed in claim 8, wherein the pneumatic control latching valve is in a closed state in said first operating state and in an open state in said second operating state.

11. A CTIS as claimed in claim 8 comprising a second control valve connected to a second compressed air source; wherein the electronic processor is configured to output a second valve open signal to open the second control valve to supply compressed air from the second compressed air source to the tire.

12. A CTIS as claimed in claim 11, wherein the second valve open signal is output in dependence on identification of the change from said first operating state to said second operating state.

13. A CTIS as claimed in claim 8 comprising a plurality of said pneumatic control latching valves each configured to control the supply of compressed air to a respective tire.

14. A CTIS as claimed in claim 13, wherein the controller is configured to control two or more of said pneumatic control latching valves simultaneously; or to control two or more of said pneumatic control latching valves sequentially.

15. A vehicle comprising a CTIS as claimed in claim 8.

16. A method of controlling an operating state of a pneumatic control latching valve disposed in a supply line, the method comprising:
generating a pneumatic control signal for changing an operating state of the pneumatic control latching valve;
monitoring a supply-side pressure; and
determining that the pneumatic control latching valve has changed operating state in dependence on detection of a change in the supply-side pressure;
wherein the pneumatic control signal is terminated upon determining that the pneumatic control latching valve has changed operating state thereby causing the pneumatic valve to latch in the changed operating state.

17. A method as claimed in claim 16 comprising opening a first control valve to initiate the pneumatic control signal; and closing the first control valve to terminate said pneumatic control signal.

18. A method as claimed in claim 17 comprising closing the first control valve upon determining that the pneumatic control latching valve has changed operating state.

19. A method as claimed in claim 17 comprising closing the first control valve if the change in the operating state of the pneumatic control latching valve is not detected within a predefined time period.

20. A non-transitory, computer-readable storage medium storing instructions thereon that when executed by one or more electronic processors causes the one or more electronic processors to carry out the method of claim 16.

* * * * *